(12) United States Patent
Eynard

(10) Patent No.: US 6,729,006 B2
(45) Date of Patent: May 4, 2004

(54) PROCESS FOR DEMOUNTING A TIRE ON A RIM HAVING SEATS INCLINED TOWARDS THE OUTSIDE

(75) Inventor: Claude Eynard, Chanat-la-Mouteyre (FR)

(73) Assignee: Michelin Recherche & Technique S.A., Granges-Paccot (CH)

( * ) Notice: Subject to any disclaimer, the term of this patent is extended or adjusted under 35 U.S.C. 154(b) by 0 days.

(21) Appl. No.: 10/034,103

(22) Filed: Dec. 20, 2001

(65) Prior Publication Data

US 2002/0084015 A1 Jul. 4, 2002

Related U.S. Application Data

(63) Continuation of application No. PCT/EP00/04769, filed on May 25, 2000.

(30) Foreign Application Priority Data

Jun. 21, 1999 (FR) .............................................. 99 07881

(51) Int. Cl.[7] .......................... B23D 19/00; B60C 25/04
(52) U.S. Cl. .................. 29/426.6; 29/426.1; 29/426.5; 29/894.31; 157/1.3
(58) Field of Search .............................. 29/426.1, 426.5, 29/426.6, 894.31, 22, 894.322; 157/1.1, 1.2, 1.26, 1.28, 1.3, 14, 15, 16, 18, 20

(56) References Cited

U.S. PATENT DOCUMENTS

| | | | | |
|---|---|---|---|---|
| 4,181,170 A | * | 1/1980 | Price et al. ................... | 157/1.1 |
| 5,555,922 A | * | 9/1996 | Brunner ..................... | 157/1.17 |
| 5,634,993 A | * | 6/1997 | Drieux et al. ................ | 152/158 |
| 5,749,982 A | | 5/1998 | Muhlhoff et al. ........... | 152/158 |
| 5,787,950 A | | 8/1998 | Muhlhoff et al. ........... | 152/379 |
| 5,836,366 A | | 11/1998 | Muhlhoff .................... | 152/379 |
| 6,092,575 A | | 7/2000 | Drieux et al. ................ | 152/158 |

FOREIGN PATENT DOCUMENTS

| | | |
|---|---|---|
| DE | 3910807 | 5/1990 |
| FR | 2320200 | 3/1977 |
| FR | 2699121 | 6/1994 |
| FR | 2713557 | 6/1995 |
| FR | 2713558 | 6/1995 |
| FR | 2720977 | 12/1995 |
| JP | 406255327 | * 9/1994 |

* cited by examiner

Primary Examiner—John C. Hong
(74) Attorney, Agent, or Firm—Baker Botts L.L.P.

(57) ABSTRACT

A process for demounting a tire P, and a tread-bearing support S internal thereto, from an integral mounting rim J, which comprises first and second rim seats, the two rim seats being inclined towards the outside and extended axially to the outside by projections of low height. The process includes the steps of inserting, into a lubricated gap between the toe of the first bead $B_o$ and the corresponding rim seat, a demounting insert I in the form of a portion of a circular ring of triangular meridian section of small dimensions, and then ejecting the first bead $B_o$ from the rim J before or simultaneously with the ejection of the tire/support assembly.

8 Claims, 5 Drawing Sheets

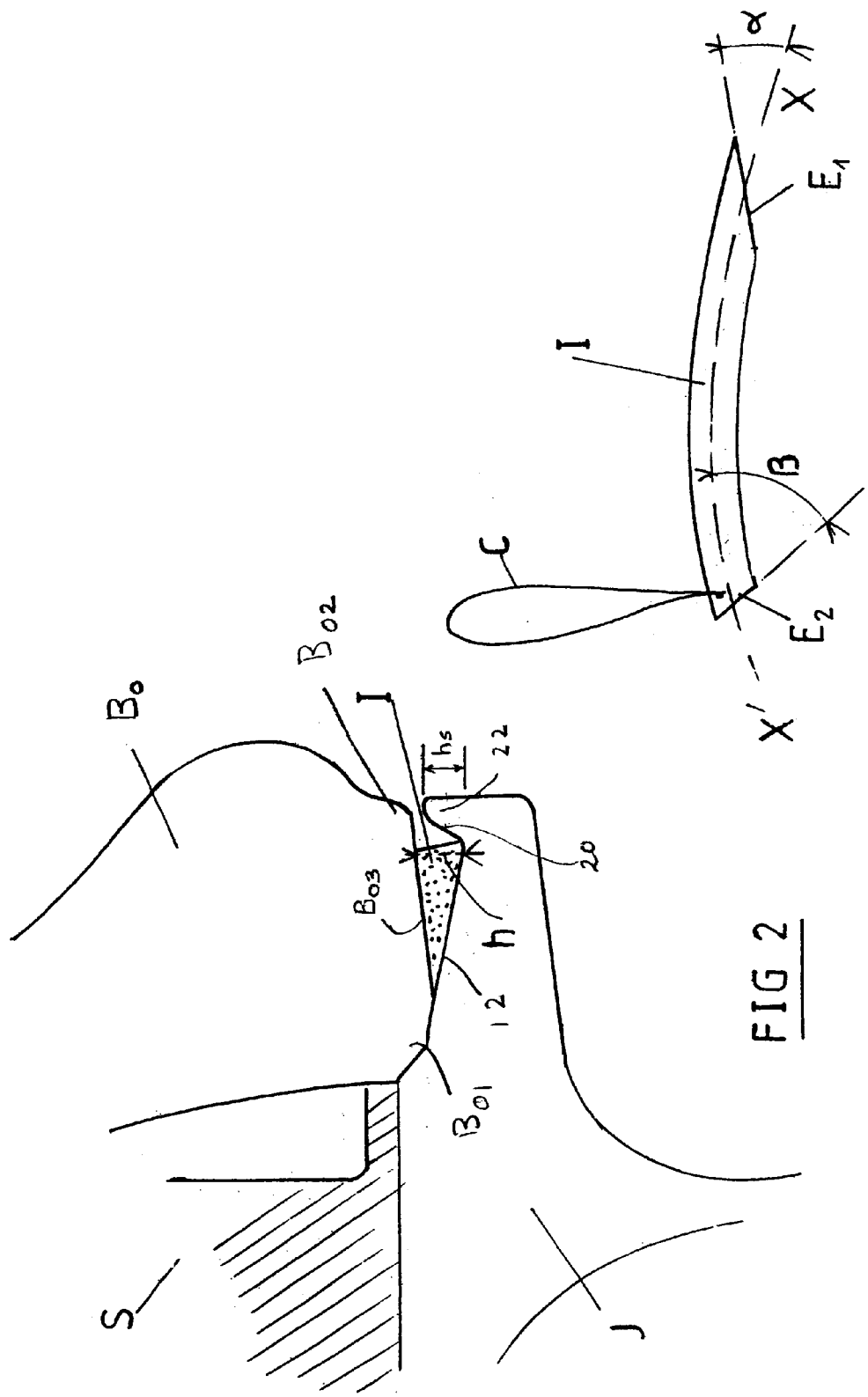

PROCESS FOR DEMOUNTING A TIRE ON A RIM HAVING SEATS INCLINED TOWARDS THE OUTSIDE

CROSS REFERENCE TO RELATED APPLICATION

This is a continuation of international application PCT/EP 00/04769, filed May 25, 2000 and published as WO 00/78567 A1 in French on Dec. 28, 2000, which claims priority of French application 99/07881, filed Jun. 21, 1999.

TECHNICAL FIELD OF THE INVENTION

The subject of the present invention is a process for demounting from its operating rim an assembly formed, firstly, of a tire with radial carcass reinforcement and, secondly, of a removable tread supporting ring, and more particularly an assembly intended to be mounted on an integral rim, at least one of the seats of which is inclined towards the outside.

BACKGROUND OF THE INVENTION

French Patents FR 2,699,121, FR 2,713,557 and FR 2,713,558 describe a wheel rim which includes, when viewed in meridian section, a first seat, the axially outer end of which is on a circle of diameter less than the diameter of the circle on which the axially inner end is located (such a seat is referred to as being inclined towards the outside), a bearing surface of greater or lesser size intended to receive a removable tread supporting ring, possibly a mounting groove, and a second rim seat which is either identical to or different from the first rim seat. Such rim forms, with a tire, the meridian profile of the carcass reinforcement of which and the shape of the beads of which are adapted, and with a removable tread-bearing support, a high-performance rolling assembly for the case of travel at low pressure or even at zero pressure.

Patent FR 2,720,977 describes a process for mounting a tire, having first and second beads, and the removable tread-bearing support which accompanies it, on an integral mounting rim, having first and second rim seats, at least the first rim seat of which is inclined towards the outside, extended axially onto the outside by a projection of low height, and joined axially onto the inside to a bearing surface intended to receive the tread-bearing support. The disclosed mounting process includes the steps of firstly introducing the tread-bearing support into the tire, then
presenting on the rim the second bead on the opposite side to the second rim seat, then causing it to pass over the rim bearing surface by means of positioning means, and finally
performing the final mounting stages, such final stages differing according to the specific features of the mounting rim.

If the nominal diameter of the second rim seat is greater than that of the first seat, and in the case of a tread-bearing support of a width less than the axial distance between the inner walls of the two beads, mounting is simple and the possible use of mounting levers to bring the second bead out of its seat, owing to the low forces imposed, does not have any consequence on the integrity of the tire. In contrast, the demounting of such a tire/support assembly involves a sequence of operations, one of which requires the use of demounting levers, i.e., during the phase in which the first or outer bead has to be made to pass out of its seat over the projection or hump formed by the outer edge of the rim. This manual operation requires at least two demounting levers and involves two major disadvantages: (1) the deterioration of the mounting rim due to intense pressure of the levers on the projection, which deterioration is all the greater when the wheel is made of lightweight alloy, and (2) the deterioration of the tire bead in question, by bursting and/or cutting of the rubber forming the outer protective layer located radially beneath the anchoring bead wire of the carcass reinforcement. Such bursting results from the pinching of the rubber between the bead wire and rim seat, which may allow air and/or humidity to pass into the sidewall of the tire via the reinforcement elements of the carcass reinforcement, and thus cause the reinforcement elements to become detached from the liner until the tire is taken out of service.

Overcoming such disadvantages requires at least the use of a single demounting lever, and preferably the complete elimination of the use of such levers, utilizing the opportune fact that the rolling assembly comprises effectively one tread-bearing support.

SUMMARY OF THE INVENTION

In order to demount a tire, comprising a first bead and a second bead, and the tread-bearing support which is internal thereto, from an integral mounting rim, comprising a first and a second rim seat, at least the first rim seat of which is inclined towards the outside, extended axially to the outside by a projection of low height and joined axially to the inside to a bearing surface intended to receive the tread-bearing support, the demounting process, according to the invention, comprises the steps of:
pivoting the first bead on its seat around its heel, by the rolling of at least one rotary roller bearing on the bead, so as to create a gap between the toe of the bead and the rim seat,
lubricating the gap thus created,
introducing into the gap a demounting insert in the form of a portion of a circular ring of triangular meridian section, the height of which is at least equal to the radial height of the projection of the rim edge in question, and
using the insert to eject the first bead and the assembly formed of the tire and the tread-bearing support from the mounting rim.

The final stage of the foregoing demounting process can be carried out in various ways, using different means. If the mounting and demounting machine used comprises one or more rotary so-called pressure rollers on either side of the tire/wheel assembly, a thrust is exerted on the second bead in the direction of the axis of rotation of the assembly by means of a rotary roller, such thrust dislodging the second bead from its rim seat and being transmitted to the first bead via the bearing support, thereby permitting dislodgment of the first bead from its seat. The demounting process is terminated by continuing the thrust until the whole of the tire and the support is completely removed.

The foregoing process is perfectly suitable for a mounting machine provided with at least two pressure rollers, one on either side of the tire/wheel assembly. Some machines, however, have only one pressure roller, located on one side only of the assembly. Whether it is a machine with horizontal rotary plates or a machine having a horizontal axis of revolution, it is then necessary to provide an additional stage in the demounting process, which stage consists simply, after placing the demounting insert between the first bead and the rim, of returning the tire/wheel assembly to the machine, such that the rotary roller can exert a pressure force on the second bead.

It is possible that some mounting and demounting machines may have one or more rollers that cannot exert sufficient thrust to dislodge the first bead from its seat. It is then advantageous to use a mounting lever to dislodge the bead, and such a use is accompanied by the use of a demounting insert provided with a lever insertion notch and a rim protection tongue.

The demounting insert may be of plastics material such as polyethylene, polyurethane or another known plastics material. It may also be of elastomeric material of sufficient Shore A hardness, i.e., of between 60 and 95 points.

The preferred length of the plastic insert is between 0.25 and 0.40 times the circumferential length of the bead seat measured at its axially outer end. If such length is less than 0.25 times the circumferential length of the seat, the insert is ineffective. The same applies if the length is greater than 0.40 times the circumferential length of the seat, because this excessive length involves excessive clamping of the tire on the rim provided with the insert.

DESCRIPTION OF THE DRAWINGS

The invention is illustrated by the drawings attached to the specification, showing the different stages of the demounting process in the case of a plurality of mounting rims, in which drawings:

FIG. 1B(b) is an enlarged detail view of a portion of FIG. 1B(a);

FIG. 2 is an enlarged meridian section of the demounting insert mounted on the rim seat;

FIG. 3 shows the ends of a preferred embodiment of a demounting insert; and

DESCRIPTION OF PREFERRED EMBODIMENTS

Figure 1B:
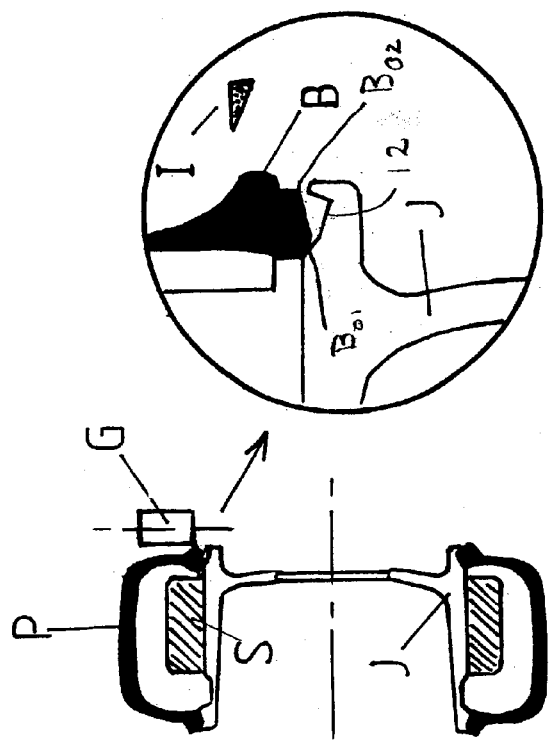
FIGS. 1A to 1H show the different stages of the process.
Figure 1A:
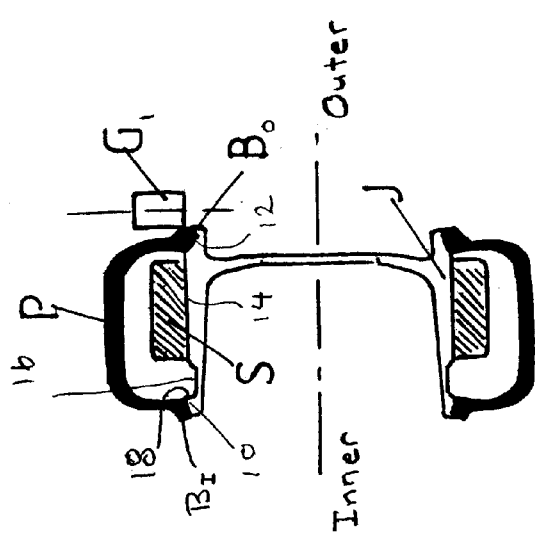

The rolling assembly, as shown in FIG. 1A, comprises mainly a rim J, a tire P and a bearing support S for a tread. The rim J basically comprises two rim seats 10, 12 inclined towards the outside (the axially outer end of the seat being located on a circle of smaller diameter than the circle on which the axially inner end is located). One of the seats, in the example illustrated the seat 10 located on the inner side of the vehicle and referred to as inner seat or second seat, has a diameter (diameter of the circle on which the axially inner end is located) which is larger than the diameter of the other seat 12, referred to as the outer seat or first seat. "Axial direction" is to be understood to mean the direction of the axis of rotation of the assembly. The outer seat 12 is extended axially by a bearing surface 14 onto which the support S will be slid, such bearing surface 14 itself being extended by a mounting groove 16, which in turn is joined to the second rim seat 10 by means of a flange 18.

The demounting operation begins (FIG. 1A) by the rolling of the first bead or outer bead $B_o$, by means of at least one rotary roller $G_1$, which induces the pivoting of the bead $B_o$ about its heel $B_{o1}$ (the part of the bead which is axially to the inside) and the creation of a gap between the rim seat 12 and the toe $B_{o2}$ of the bead $B_o$, which gap is necessary for lubricating the bottom of the bead toe $B_{o2}$ and for positioning a demounting insert I. See FIGS. 1B(a) and 1B(b). The insert I is a circumferential portion, of a length equal to approximately 30% of the internal circumferential length of the circumference of the outer seat 12 at its outer end, of a circular ring made of flexible plastics material (polyamide), the cross section of which is a substantially right-angle triangle of small dimensions (FIG. 2). The wall, the generatrix of which is the hypotenuse of such a triangle, is the face which will be in contact with the frustoconical wall of the rim seat 12, whereas the other two walls corresponding to the sides of the right angle will be, for the longer side, in contact with the frustoconical wall of the bead seat $B_{o3}$ and, for the shorter side, in contact with the inner wall 20 of the projection of the rim edge 22. The radial height h of the insert, as measured downwardly perpendicular to the axis of rotation, from the point of intersection of the two sides of the right angle to the hypotenuse, is equal to or very slightly greater than the height $h_s$ of the projection of the rim edge 22, which height $h_s$ is measured between the axially outer end of the rim seat 12 and the line parallel to the axis of rotation drawn from the apex of the projection. See FIG. 2.

Since the preferred form of the meridian section of the insert I is triangular, the circumferential ends of the insert are beveled (FIG. 3). For easier insertion, the end $E_1$ which will penetrate first into the gap created by the pressure of the roller $G_1$ is beveled at an angle α, relative to the median line X–X' of the insert I, of between 15° and 70°. For more secure holding in place, the second end $E_2$ is beveled at an angle β which is other than 90° and preferably less than 70°.

Upon the simultaneous translation of the tire P and the bearing support S out of the rim J, the insert I may sometimes inconveniently slide between the support S and the bearing surface 14 on which the support S rests, preventing rapid removal of the tire/support assembly. The insert I, therefore, is preferably provided with a disengagement cord C which can be used to recover the insert (FIG. 3).

Figure 1E:
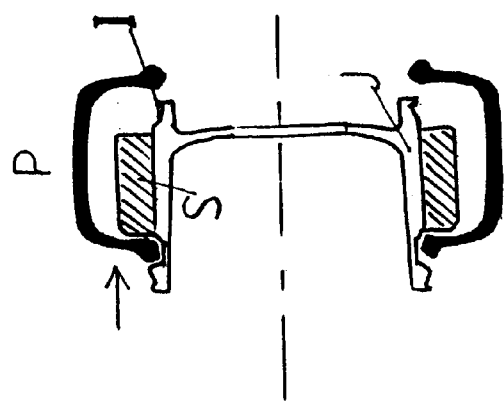
Figure 1D:
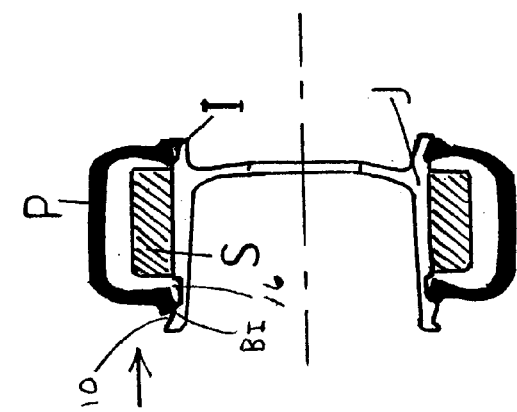
Figure 1C:
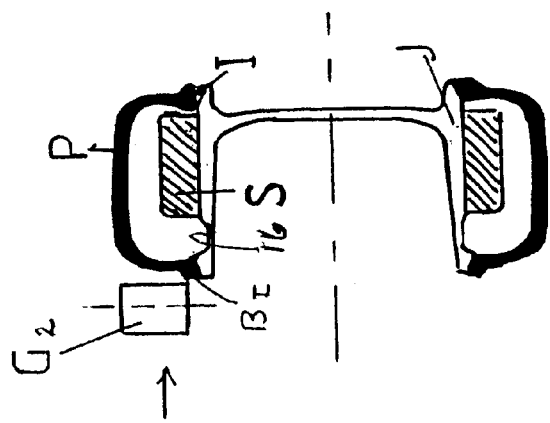
Figure 1F:
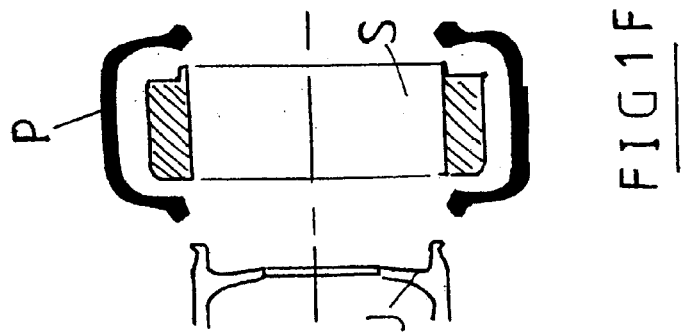
Figure 1G:
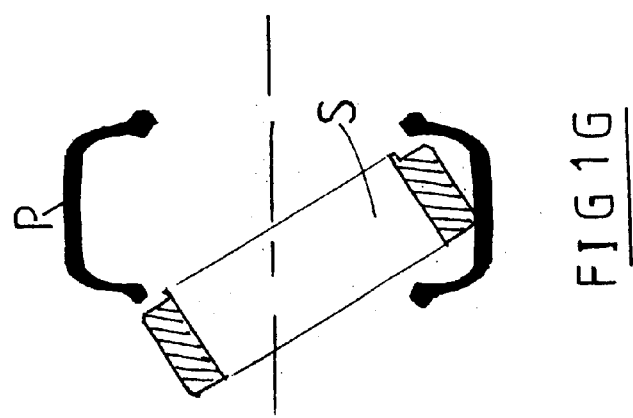
Figure 1H:
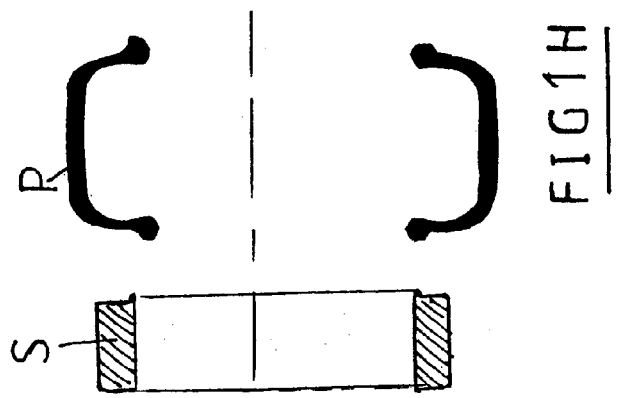

In the case of a machine for mounting and demounting having at least two pressure rollers, and with the insert I in place, an axial thrust is exerted on the second or inner bead $B_I$ (FIG. 1C), still by means of a rotary roller $G_2$, so as to dislodge the inner bead $B_I$ from its seat 10 (FIG. 1D) and to make it drop into the mounting groove 16 of the rim J. This thrust is exerted firstly at the circumferential location opposite the circumferential location of the insert I beneath the first bead $B_o$. The thrust continues to be exerted by axial advancement of the roller $G_2$, which thrust, by means of the second bead $B_I$ and the bearing support S, is translated on to the first bead $B_o$ and causes dislodgment of the first or outer bead $B_o$ (FIG. 1E) from its seat and over the projection of the rim edge 22. This operation is made easy by the presence of the insert I, the height of which is at least equal to that of the projection. The axial thrust is then prolonged until the tire P and the tread bearing support S are fully removed (FIG. 1F). It then remains to remove the bearing support S from the tire (FIG. 1G) in order to obtain all the separate elements of the assembly (FIG. 1H).

Figure 4:
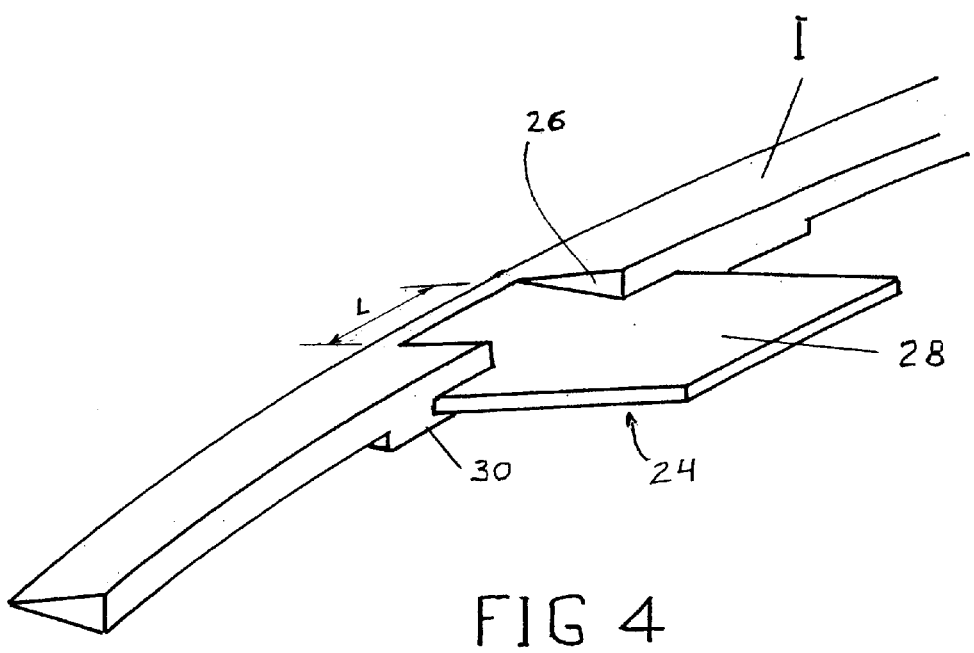
FIG. 4 shows a preferred embodiment of an insert used with a mounting lever.

In the case of a mounting and demounting machine which does not provide sufficient pressure on the first bead, it is possible to insert an additional stage into the process. After the necessary gap has been created, such additional stage consists in using a single demounting lever 24 to remove the first bead $B_o$ from the rim J. In this case, the insert I used (FIG. 4) is provided, approximately in its center, with a notch or radial groove 26, intended to permit engagement of the head of the lever 24 without damaging the bead. The mounting lever 24 is extended laterally by a thin flat tongue 28, intended to protect the rim during manipulation of the mounting lever 24. An excess thickness 30 of material is present on that face of the insert I which has to come into contact with the rim over a circumferential length greater than the length L of the notch 26, so as to reinforce that part of the insert I that is weakened by the presence of the notch 26. As previously, the rest of the process in this case, consists either in exerting a thrust on the second bead $B_I$ until complete evacuation of the tire/support assembly takes place, or firstly returning the tire P and the mounting rim J to the demounting machine and ejecting the assembly.

What is claimed is:

1. A process for demounting an assembly formed of a tire P, having a first bead $B_o$ and a second bead $B_I$, said beads each having a heel and a toe and a bead seat extending therebetween, and a tread-bearing support S which is internal thereto, from a wheel having an integral mounting rim J, having a first rim seat and a second rim seat, said two rim seats being inclined towards the outside, and the first rim seat being extended axially to the outside by a first outer rim edge of low radial height $h_s$ and being joined axially to the inside to a bearing surface for the tread-bearing support S, comprising the steps of:

(a) pivoting the first bead $B_o$ on its seat around its heel, by rolling at least one rotary roller G bearing on said bead $B_o$, so as to create a radial gap between at least the toe of said first bead seat and the first rim seat;

(b) lubricating at least the toe of said first bead seat in the gap thus created;

(c) introducing into said gap radially between the first bead seat and the first rim seat a demounting insert I in the form of a portion of a circular ring of triangular meridian section, said triangular section extending axially along the first rim seat from an apex at its axially inner end to a radial height h at its axially outer end at least equal to the radial height $h_s$ of the outside projection of the first outer rim edge; and (d) ejecting the first bead $B_o$ and the assembly formed of the tire P and the tread-bearing support S from the mounting rim J over said first outer rim edge by use of the insert I.

2. A process as recited in claim 1, utilizing a mounting and demounting machine having one or more of the rotary rollers G on either side of the rim-mounted tire, wherein step (d) comprises exerting a thrust on the second bead $B_I$ in a direction of the axis of rotation of the tire and wheel, by means of at least one of the rotary rollers G, said thrust dislodging said second bead $B_I$ from its rim seat and being transmitted to the first bead $B_o$ via the tread-bearing support S, permitting dislodgment of said first bead $B_o$ from its seat.

3. A process as recited in claim 1 utilizing a mounting and demounting machine having one or more of the rotary rollers G on one side only of a rim-mounted tire, further comprising the step of, after placing the demounting insert I between the first bead $B_o$ and the rim J, the rim-mounted tire is returned to the machine, such that the rotary roller G can exert a pressure force on the second bead $B_I$.

4. A process as recited in claim 2, wherein, after placing the demounting insert I between the first bead $B_o$ and the rim J, said insert I being provided with a lever insertion notch and a rim protection tongue, the first bead $B_o$ is ejected by means of a demounting lever.

5. A process as recited in claim 3, wherein, after placing the demounting insert I between the first bead $B_o$ and the rim J, said insert being provided with a lever insertion notch and a rim protection tongue, the first bead $B_o$ is ejected by means of a demounting lever.

6. A process as recited in claim 1, wherein the insert I used is comprised of plastics material.

7. A process as recited in claim 1, wherein the insert I used has a circumferential length of between 0.25 and 0.40 times the circumferential length of the first bead seat, measured at the axially outer end of the first seat.

8. A process according to claim 7, wherein the insert I used has circumferential beveled ends $E_1$ and $E_2$.

* * * * *